*GENERAL INFORMATION SIGNAL FLOW*
FIG. 1

July 4, 1961 E. LEONARD 2,991,453
PROGRAM DEVICE
Filed March 23, 1956 7 Sheets-Sheet 3

*INVENTOR.*
*EUGENE LEONARD*
BY
*ATTORNEY.*

*INITIATE OPERATION*
*FIG. 5*

INVENTOR.
EUGENE LEONARD

United States Patent Office 2,991,453
Patented July 4, 1961

2,991,453
PROGRAM DEVICE
Eugene Leonard, Port Washington, N.Y., assignor, by mesne assignments, to Curtiss-Wright Corporation, Carlstadt, N.J., a corporation of Delaware
Filed Mar. 23, 1956, Ser. No. 573,372
6 Claims. (Cl. 340—172.5)

This invention relates generally to calculating and data processing apparatus, and more particularly to an indexing device that selects a discrete program for sequentially controlling the operations performed by the apparatus.

Data processing problems can be broken down into a sequence of simple arithmetic and logical operations. Electronic data processing apparatus is capable of carrying out these arithmetic and logical operations at extremely high speeds. Electronic data processing apparatus can therefore be used to solve data processing problems of great length and complexity in a small fraction of the time required by a human being.

The advantages of an electronic data processing system for scientific and business applications in comparison with the machines of the mechanical type are many. An electronic data processing system can remember what is told it; add, subtract, multiply and divide; locate a particular number from a group or table of numbers; perform operations sequentially; inspect computation results and make a decision; check the accuracy of generated answers; sort and arrange data in sequence; sense the completion of a problem and proceed to a new problem; and work with a minimum of supervision.

Thus, an electronic data processor is eminently suitable for the high speed solution of data processing problems. The system saves time and money by reducing clerical help in the following ways:

(1) Reduces operating steps;
(2) Combines operations;
(3) Routinizes exceptions by the ability to follow complicated instructions; and
(4) Handles new applications. Problems requiring judgment and decision can be handled and the only limitation is the ability to translate a problem into language which the machine can understand.

Some of the business applications that can be performed by a data processing system are: payroll to handle the payroll records and cost analyses; sales analysis and market forecasts for giving proper weight to all factors; inventory control for keeping up to the minute track of sales, purchasing, manufacture and stock of many items; production control to eliminate the gap between production schedule preparation and actual performance; projecting labor requirements from the bill of material to determine requirements by operation and skill; and reports giving current sales, costs and forecasts, instead of history.

The data of a problem can be inserted into the system from tape, punched cards or by typing the numerical digits of the information on a keyboard which is a part of the system and by other methods.

Data processing systems are usually designed to manipulate information which is composed of binary-coded decimal numbers, that is, of decimal numbers expressed in the binary system. As the only digits used in the binary system are one and zero, the binary system is readily adaptable to electronic expression by the presence or absence of a pulse signal. The presence of a pulse signal is used to represent the binary digit one and the absence of a pulse signal is used to represent the binary digit zero.

The electronic circuitry converts decimal numbers into arrangements of these binary digits (commonly called bits) for storage or utilization on a rotating magnetic device or elsewhere in the equipment. Four bits represent a digit and the value of the bit is determined by its location in the group:

0=0000 no bit in any position
1=0001 a bit in the first position
2=0010 a bit in the second position
4=0100 a bit in the third position
8=1000 a bit in the fourth position It should be noted that the numerical value of each bit is doubled as it is moved from right to left.

All other digits are made up of combinations of the bits as follows:

3=0011 a combination of the bits for 2 and 1
5=0101 a combination of the bits for 4 and 1
6=0110 a combination of the bits for 4 and 2
7=0111 a combination of the bits for 4 and 2 and 1
9=1001 a combination of the bits for 8 and 1

Mathematically the binary system is a numerical means of expressing a quantity in terms of coefficients of powers of two. For example, the decimal digit 7 is expressed as 0111 in the binary system as shown below:

As used 0111
As understood $0(2)^3+1(2)^2+1(2)^1+1(2)^0$
Or $0+4+2+1=7$

In summation, the following table contains the decimal numbers from zero through ten and their binary equivalents.

| Decimal number: | Binary equivalent |
|---|---|
| 0 | 0000 |
| 1 | 0001 |
| 2 | 0010 |
| 3 | 0011 |
| 4 | 0100 |
| 5 | 0101 |
| 6 | 0110 |
| 7 | 0111 |
| 8 | 1000 |
| 9 | 1001 |
| 10 | 1010 |

All data processing systems can perform the following operations: input, storage, arithmetic, control and output. Data is inserted through one or more of the input mechanisms, held in the storage devices until required, and then acted upon by the arithmetic unit; after which it is returned to the storage device, and written out by one or more of the output devices.

All this is done under the direction of the control mechanism or programming unit.

Each particular problem that is to be solved by the data processing system is broken down into a sequence of simple operations or steps. Each of these steps is specified by an instruction and the sequence of instructions is called the program. All necessary data is entered into the main storage device. The system thereafter carries out the instructions automatically and at high speed under control of the programming unit.

As the data is entered into a data processor it is converted to the appropriate binary form for storage. The storage device may be a rotating magnetic device such as a magnetic drum or disk, vacuum tubes or magnetic cores. The information stored can be data constants or generated intermediate answers. Instructions can also be stored in the memory. Each item in the memory has its own location or "address."

When the data processor has finished its work the resulting data must be written out. This can be done on line printers, magnetic or punched tape, punched cards, or typewriters. The output data can be put on the desired forms directly by line printers or by using the resulting tape to control suitable printing mechanisms.

Generally the operations of a data processor are determined by prepared program data. The program data is usually stored in a memory; for example, as a group of instructions in a sequence of addresses on a rotating magnetic storage device. The instructions are fed to the control unit one at a time from their location in the memory. Each instruction describes the location of each item which is to be used in the computation, what is to be done to it and where the results are to be stored. Relatively complex and expensive apparatus for locating each address at the proper time is necessary.

One of the most recent advances in programming units for an electronic data program is a relatively simple and inexpensive programming unit comprising a long control belt containing punched holes. The data for each step or instruction of a program is recorded along a line across the width of the control belt. Apparatus is provided for moving the control belt one or more steps either in the forward or reverse direction. Sensing apparatus senses the control data and generates corresponding control signals at each step. Means are provided for moving the control belt forward or backward to any particular step. A programming unit of this type is described and claimed in the copending U.S. patent application of Samuel Lubkin for "Electronic Calculator," Serial No. 567,566, filed on February 24, 1956, now Patent 2,945,213 granted on July 12, 1960.

To direct the numerous operations that are required in the solution of data processing problems a group of specific programs is required. For example, one program may direct the data processor to perform a complete payroll operation, a second program may direct a data processor to perform a sales analysis, or a third program may direct a data processor to indicate current inventory records.

Therefore, it is desirable that a data processor utilize a programming unit that can direct the operation of a data processor towards the solution of any one or a number of chosen problem. Each program must be readily available and easily identifiable. The programming unit should be simple in design, reliable in operation, cheap to produce and utilize a minimum number of components. Groups of programs that are incorporated on a belt and utilized in a data processor must be identifiable so that any one of the group of available programs can be rapidly located and properly oriented to direct the desired operations.

Therefore, it is a primary object of this invention to provide an improved program locating device.

It is an additional object of this invention to provide an improved program locating device that is inexpensive, relatively simple, and extremely flexible.

It is another object of this invention to provide an improved program locating device that imparts a forward or reverse direction to a program bearing control belt when locating a particular program.

As stated above, the programming unit comprises a relatively long belt which includes a plurality of programs. Apparatus that is activated by the programs on the belt generates signals that direct the specific operations that are required by the computer for the solution of a problem. These signals are known as control signals.

In accordance with the invention, the belt originated signals are also utilized to identify each program and, when used for this purpose, they function as information signals. Apparatus is provided to differentiate between the utilization of the generated signals as information signals or control signals.

Some of the advantages of this invention are as follows: additional space on the control belt is not required for the identification of programs and consequently the requirement of additional sensing apparatus is avoided. In other words, the number of components required to sense the programs associated with the belt is reduced as a result of the utilization of the generated signals first as information signals to locate a specific program and then as control signals to direct the operations of a data processor.

Other objects and many of the attendant advantages of this invention will be readily appreciated as the apparatus becomes better understood by reference to the following detailed description when considered in connection with the accompanying drawings wherein:

This application discloses subject matter that is disclosed and also claimed in my co-pending application Ser. No. 631,723, filed December 31, 1956, now Patent 2,955,821, dated October 11, 1960.

To facilitate the description, a data processing system such as the system disclosed in the above-cited Lubkin patent which incorporates the invention will first be described. The description of the system has been deliberately abbreviated, so that the features of the present invention may be emphasized. For a complete description of the system, reference is made to the Lubkin patent. The drawing figures of the present invention are respectively the same as FIGS. 6, 2, 44a, 44b, 8, 4, 6, 18 and 47 of the Lubkin patent, and also of the application of Evelyn Berezin for "Electronic Calculator Apparatus," Serial No. 567,567, filed concurrently therewith, now Patent 2,973,141, dated February 28, 1961. The system has been divided into a plurality of operating units. Each unit can generally be defined as performing one of the following functions: input, output, program control, general control, arithmetic or memory. The operations of the data processing system will be described in terms of the interaction of signals between these units. The input units (FIG. 1) are the keyboard 142, the number thyratrons 141, and a portion of the paper tape input-output 145.

Figure 1:
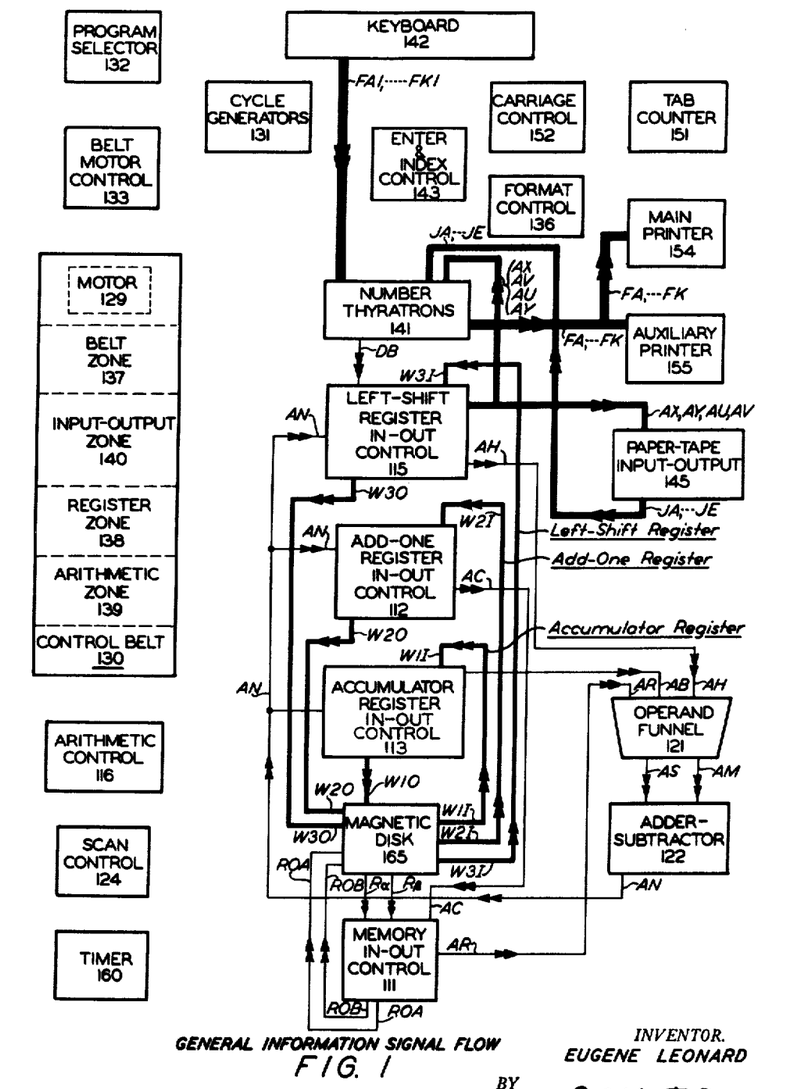
FIG. 1 is a block diagram that illustrates diagrammatically the flow of information signals during a general information signal flow of a data processor which incorporates the invention.

The output units are the main printer 154, the auxiliary printer 155, the carriage control 152, the tab counter 151, the format control 136, and a portion of the paper input-output 145.

The program control units comprise the control belt 130, the program selector 132, and the belt motor control 133.

The general control units consist of the cycle generators 131, the enter and index control 143, the arithmetic control 116, the scan control 124 and the timer 160.

The arithmetic units comprise the left-shift register in-out control 115, the add-one register in-out control 112, the accumulator-register in-out control 113 which are associated with the left-shift add-one and accumulator registers respectively, the adder-subtractor 122 and the operand funnel 121.

The memory register units are the in-out control 111 and the magnetic disk 165.

The keyboard 142 is primarily an input device. It comprises ten number keys by means of which numbers may be manually entered, motor bar keys for terminating entries in several ways, and manual switches used both for modifying entry operations and for providing means for generating signals required in maintenance and test procedures.

The number thyratrons 141 serves as a decoder and an intermediate or buffer storage device between the main body of the computer and the main and auxiliary printers 154 and 155, and as an encoder between the keyboard 142 and the remaining part of the computer system.

The paper tape input-output 145 comprises both a motorized paper tape reader and motorized paper tape punch. It also contains suitable control equipment and intermediate or buffer storage apparatus for passing information to and from the main portion of the computer.

The main printer 154 is a modified Underwood Sundstrand Model C Accounting Machine with the calculating apparatus removed. It handles a ledger card such as an earnings record, and a second form which may be a check register.

The auxiliary printer 155 is also a modified Underwood Sundstrand Model C Accounting Machine with the calculating apparatus removed. It is provided with a pin feed to handle continuous forms such as checks. Both printers are provided with solenoids to activate normal mechanical movements by means of electrical signals from the computer.

The carriage control 152 regulates the lateral movements of the carriages of the main printer 154 and the auxiliary printer 155. It controls primarily carriage return movements and tabulations. Since each carriage can move independently of the other a separate set of control circuits is included for each of the printers 154 and 155.

The tab counter 151 is used to store the count of the number of tabs the carriage of the main printer 154 is to perform. Instead of performing single tabs upon command a number of tabs may be accumulated and stored to be performed in one operation prior to printing. Since the carriage of the main printer 154 can tabulate in either direction (forward or reverse) the tab counter 151 stores the accumulated count algebraically (as either a positive or negative number).

The format control 136 generates control signals which determine the format for the printed information. For example, it may instruct the printers to print only the dollars portion of a number or the cents portion of a number or a date, or change the vertical position of the form.

The control belt 130 is the central control of the computer. It includes a long belt capable of movement in a forward or reverse direction together with apparatus for sensing indicia on the belt. It also includes a drive coupled to a stepping motor 129 which permits a controlled stepwise movement of the belt. The actual belt has arrays of hole positions oriented in lines perpendicular to the direction of motion. Opposite most of the hole positions are mechanical feelers which sense for holes to cause the generation of pairs of control signals of opposite polarity. The hole positions are divided into four zones. The belt zone 137 generates control signals which regulate movement of the control belt 130. The input-output zone 140 generates control signals which determine the input-output operations. The register zone 138 is serially scanned photoelectrically to generate signals which indicate particular memory registers. This is the only zone not employing mechanical feelers. The arithmetic zone 139 generates control signals for determining which arithmetic operations are to be performed.

The program selector 132 comprises a plurality of manual switches for selecting a particular program in the control belt 130, and a comparator to compare a number set up by the manual switches with a number as represented by signals generated by hole combinations received from the control belt 130.

The belt motor control 133 is primarily a current waveform generator which feeds appropriate current pulses to the motor 129 for activating the drive to step the control belt 130 in the forward or reverse direction.

The cycle generators 131 sequences the computer through the steps of a program instruction and sequences the computer from program instruction to program instruction.

The enter and index control 143 sequences the computer through the input and the output operations.

The arithmetic control 116 is primarily a static control register which sets up control signals that route and sequence the flow of information through the computer during arithmetic operations.

The scan control 124 is primarily a memory register gating control which functions in conjunction with the register zone 138 to make the contents of memory registers available for processing.

The timer 160 generates repetitive signals from cycling units for synchronization, timing and waveform shaping throughout the computer.

There are three working registers associated with the arithmetic section of the computer; the left-shift register, the add-one register and the accumulator register.

The left-shift register comprises the left-shift register in-out control 115, the W30 signal line, a channel of the magnetic disk 165, and the W31 signal line. The left-shift register is used during input and output operations to permit digit by digit transfers to occur, and during multiplication to store the multiplicand.

The add-one register comprises the add-one register in-out control 112, the W20 signal line, a channel of the magnetic disk 165, and the W21 signal line. The add-one register is used as a counting register during input and output operations for counting the number of digits transferred, as a storage register for the multiplier during multiplication, and as a delay means during other arithmetic operations.

The accumulator register comprises the accumulator register in-out control 113, the W10 signal line, a channel of the magnetic disk 165 and the W11 signal line. The accumulator register in addition to serving its usual functions of storing operands during addition and subtraction operations, stores the partial products during multiplication operations.

The adder-subtractor 122 is an arithmetic unit capable of serially adding and subtracting binary-coded decimal digits. The adder-subtractor 122 is described and claimed in the co-pending application of Evelyn Berezin and Phyllis Hersh, Serial No. 558,270, filed January 10, 1956, now Patent 2,943,790, granted on July 5, 1960.

The operand funnel 121 selects from a plurality of sources the numbers to be fed to the adder-subtractor 122 as operands.

The memory register in-out control 111 acts as a gating control to shunt information between two channels of the magnetic disk 165 and other parts of the computer system.

The magnetic disk 165 has six channels each with appropriate magnetic recording and reproducing heads. Two channels are for storage, each storage channel can store up to fifty complete numbers. The storage space allotted to each number is called a memory register. Three channels are recirculation register channels, having their recording and reproducing heads arranged so that a delay in time of slightly less than one minor cycle (the time required for a complete number to pass a given point) occurs between reproducing and recording. Each of these recirculating registers is part of a working register. When the delay introduced by the external circuitry of the working register is added to the delay achieved by the magnetic head displacement a total delay of one minor cycle is obtained so that each working register can store one complete word.

The sixth channel carries a square wave recording used to generate clock pulses. The clock pulse signals are fed to the timer 160 to provide the synchronizing and time signals for the computer. One pulse of the square wave is missing. Use is made of the absence of the pulse to synchronize the computer to the magnetic disk 165.

The schematic illustrations are usually arranged so that input lines enter at the left and top sides of each unit and output lines leave at the bottom and right sides of each unit.

The lines that connect the blocks which denote the basic units represent cables which may contain a plurality of wires through which electrical signals are transmitted. The flow of information signals is indicated by double arrowheads on the lines which represent the cables. The flow of control signals when shown is long lines designated by single arrowheads. The polarity of the various signals will not be indicated except where important.

The lines carrying the information and control signals have letter designations that are identical with the letter designations of the signal. For example, the DB signal line (from the number thyratron 141) carries the DB signal. In the sections following the terminology will be used interchangeably. If a signal is fed via the DB signal line it is the DB signal. Or if a unit receives the DB signal it receives the DB signal via the DB signal line. When a "number" is mentioned, what is usually meant is "the signal representing the number."

The central control section 101 includes the programming unit (the control belt 130 in FIG. 2) which generates the primary control signals which direct the data process through each step of a program. The central control section 101 also includes the main storage device (the magnetic disk 165) which contains one hundred memory registers.

The control belt 130 of the central control section 101 includes the plastic belt 170 (FIG. 3) having the holes 172; a drive mechanism (FIG. 2) for moving the plastic belt 170 having a pair of sprocket wheels 174a and 174b with sprocket pins 176a and 176b to engage sprocket holes in the plastic belt 170; a stepping motor 129 coupled to rotate the sprocket wheels 174 by means of a shaft 178 to provide a stepping movement of the plastic belt 170; pin feeler housing 180a and 180b containing pin feelers which cause the generation of control signals when a portion of the holes 172 are sensed; and a light source 182 for sensing other holes 172 by means of the rotatable apertured cylinder 194 and the photocell 196.

More particularly the plastic belt 170 (FIG. 3) contains a plurality of transverse lines or rows of holes or apertures 172 (only one line is shown). Each line of holes corresponds to a step or instruction in the program. The holes 172 generate various control signals which cause the computer system to perform the represented operations. Each row of holes is divided into four zones.

Figure 3:
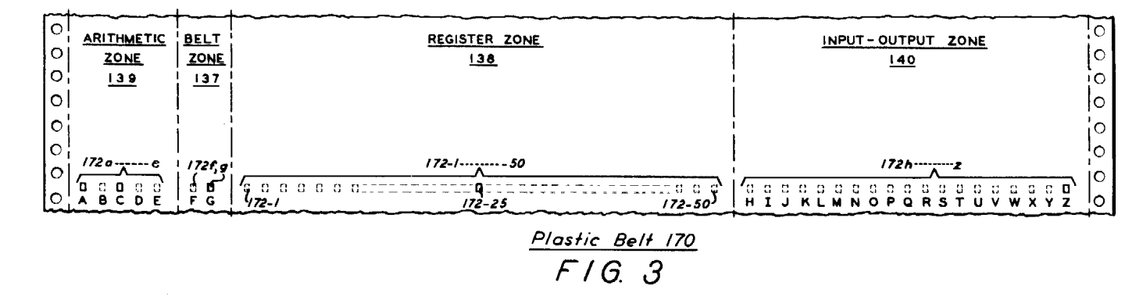
FIG. 3 is a plan view of the control belt of the programming unit.

The first five holes 172a to 172e in the arithmetic zone 139 of the control belt 130 initiate the generation of control signals which control arithmetic operations in the computer; the next two holes 172f and 172g in the belt zone 137 control movement of the control belt 130 itself; the next fifty holes 172-1 to 172-50 in the register zone 138 are in an opaque portion of the belt 170 and provide for memory register selection; and the input-output zone 140 contains remaining holes 172h to 172z which primarily control the operations of the input and output operations of the main printer 154 and the auxiliary printer 155.

Each hole position is characterized by an alphabetic notation, except in the register zone 180 where each hole position corresponds to a register number. The holes 172 in a given line which represent alphabetic notations are electro-mechanically sensed simultaneously by the pin feelers. The holes 172 which represent numerical notations corresponding to the register numbers are photoelectrically sensed sequentially.

The portion of the holes 172 sensed by the pin feelers (FIG. 2) causes the simultaneous generation of the primary control signals. The portion of the holes 172 sensed sequentially by the photo-electric apparatus is employed to designate particular memory registers in the magnetic disk 165.

The magnetic disk 165 of the central control section 101 comprises (FIG. 2): a disk 184 coated with a magnetic material and enclosed in the disk housing 186; a plurality of magnetic heads enclosed in a head housing 188; a synchronous motor 190; and a shaft 192 coupling the disk 184 to the synchronous motor 190 to provide a means for rotating the disk 184. Each of two channels on a face of the disk 184 contains fifty memory registers.

Figure 2:
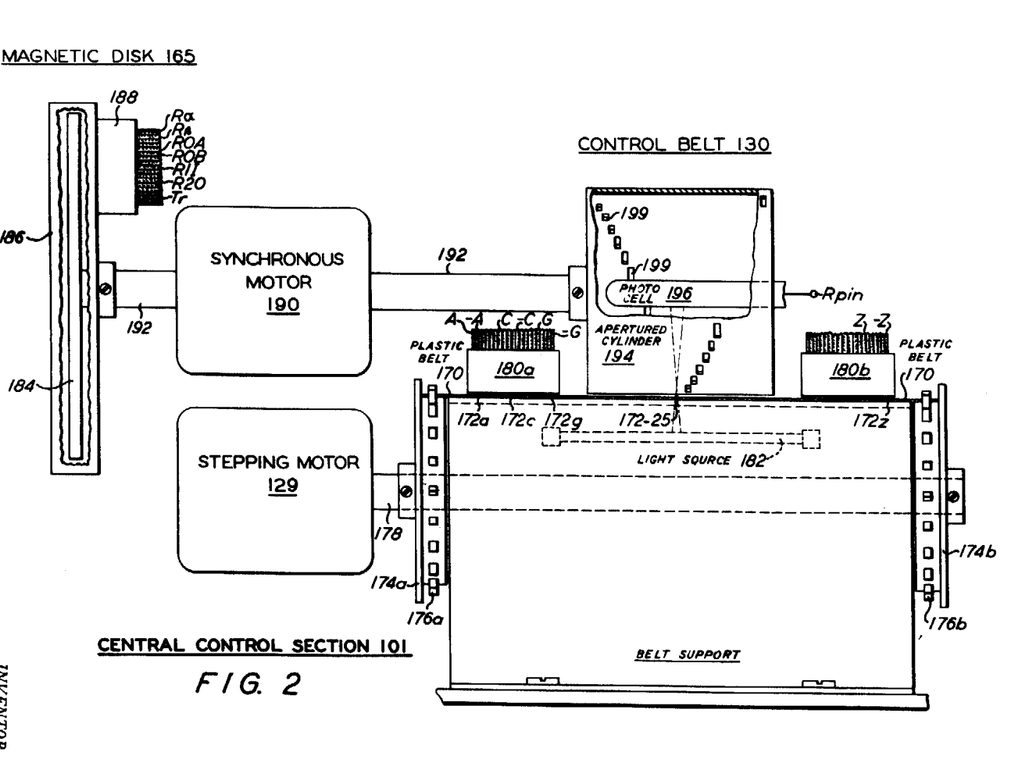
FIG. 2 illustrates the programming unit of the data processor.

The shaft 192 is also coupled to the apertured cylinder 194 which encloses the photocell 196. The apertured cylinder 194 includes a plurality of apertures 199 in a helical pattern on its surface. During the performing of a program by the computer system, the synchronous motor 190, turning at 1800 revolutions per minute, causes the synchronous rotation of the disk 184 and the apertured cylinder 194 by means of the common shaft 192.

The shaft 192 (and therefore the central axis of the apertured cylinder 194) is parallel to the plane of the plastic belt 170. The surface of the apertured cylinder 194 is opposite the plastic belt 170. Thus, the apertures 199 of the rotating apertured cylinder 194 sequentially scan holes 172-1 to 172-50 on the plastic belt 170. Therefore, storage positions on the disk 184 correspond to hole positions in a line of indicia on the plastic belt 170. Each one of fifty possible holes 172-1 to 172-50 opposite the aperture cylinder 194 is associated with a pair of memory registers, one from each channel of the disk 184. Thus it is possible to locate any memory register by first selecting one of the two channels and then detecting the corresponding hole 172.

The motor 129 is pulsed or energized periodically, each pulse causing an angular displacement of the shaft 178 equal to one forty-eighth of a revolution. The angular displacement of the shaft 178 steps the plastic belt 170 a predetermined distance, thereby placing a new line of holes 172 opposite the pin feeler housings 180. When it is said that the control belt 130 is stepped, it meant that the plastic belt 170 is moved by the associated apparatus in the control belt 130. When the new line is in position, the pin feelers sense the associated holes 172 simultaneously. Wherever a pin feeler senses the absence of the plastic material indicating that a hole 172 is present, a pair of control signals are generated; for example, the presence of the hole 172c causes the generation of the C and —C signals.

At the same time, the apertured cylinder 194 is sequentially scanning that opaque portion of the line of holes 172 in the plastic belt 170 which is opposite the apertured cylinder 194. When an aperture 199 is opposite a hole such as hole 172-25 a ray of light is transmitted from the light source 182 to the photocell 196 to cause the generation of an R pin signal which is fed to the scan control 124 to indicate the location of a memory register. Since there are fifty holes 172 which may be sensed in this manner and each hole position corresponds to a pair of memory registers, each R pin signal generated identifies one of the fifty pairs of memory registers. Since each line of the belt can accommodate fifty optically sensed holes in the register zones 138 it is possible to select one of the fifty memory registers associated with a channel of the magnetic disk 165 in one rotation of the disk 184.

An R pin signal fed to the computer initiates an information transfer between the designated memory register and the remainder of the computer system.

During a recording transfer, information is transmitted as signals from the remainder of the computer system via the ROA or ROB signal lines to an appropriate recording head for recording on the disk 184. The ROA signal line is associated with the first fifty memory registers and the ROB signal line is associated with he second fifty memory registers.

During a reproducing transfer the information, as signals, is transmitted via the R alpha or R beta signal line from an appropriate reproducing head to other parts of the computer system. The R alpha signal line is associated with the first fifty memory registers and the R beta signal line is associated with the second fifty memory registers. Therefore, in each rotation of the shaft 192 from one to fifty R pin signals may be generated, each R pin signal permitting the initiation of a recording or reproducing transfer of information. Thus access to either the first fifty or the second fifty memory registers is possible during one rotation of the shaft 192.

When the program step as determined by the computer is completed, the motor 129 is again pulsed and a new line of holes 172 is made available for sensing and a new program step commences. By providing two types of current waveforms to pulse the motor 129, the shaft 178 can be rotated clockwise or counterclockwise and therefore the plastic belt 170 can be stepped in a forward or reverse direction.

Under the control of the computer a series of current pulses can be fed to the motor 129, during which time the computer does not respond to signals generated as a result of the sensing of the holes 172. This permits stepping the plastic belt 170 a number of positions before a new program step is performed. The number of current pulses in the series is determined by a count number stored in a register. The count number stored in the register in turn is derived from one of the holes 172–1 to 172–50 which usually indicates memory register locations. However if plastic belt 170 is to be moved a number of steps the hole number gives an indication of the number of steps in the movement.

Figure 4:
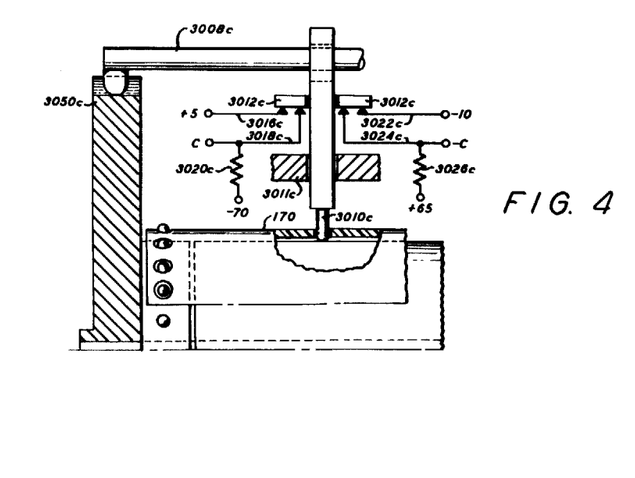
FIG. 4 is a side view of one of the pin feeler mechanisms utilized to detect holes located in the control belt.

FIG. 4 illustrates in detail a pin feeler sensing mechanism. There is one such mechanism associated with each pin sensed hole. Each mechanism is identical and all mechanisms operate simultaneously. The pin feeler mechanism associated with the hole 172c is shown comprisng the cam follower 3008c, the pen fceler 3010c, the feeler guide 3011c, the shorting bar 3012c, the contacts 3016c and 3018c, the resistor 3020c, the sorting bar 3014c, the contacts 3022c and 3024c and the resistor 3026c.

The shorting bars 3012c and 3014c are electrically insulated from the pin feeler 3010c and from each other. When the hole 172c is not being sensed, the shorting bars 3012c and 3014c are in a withdrawn position and do not short the contacts. When the presence of the hole 172c is to be sensed, the cam follower 3008c permits the pin feeler 3010c to move down. If the actual hole is present, the pin feeler 3010c drops into a hole 172c causing the shorting bar 3012c to close a circuit between the contact 3016c and the contact 3018c and a positive potential is fed to the C signal line. At the same time the shorting bar 3014c closes a circuit between the contacts 3022c and 3024c and a negative voltage is present on the —C line.

If the hole 172c is not present then the pin feeler 3010c does not move. No connection is made between the contact 3016c and the contact 3018c by the shorting bar 3012c and a negative potential is present on the C signal line. Similarly the shorting bar 3014c does not close the circuit between the contacts 3022c and 3024c and a positive potential is present on the —C signal line. When the sensing operation is terminated, the cam 3050c forces the cam follower 3008c up. Thus the pin feeler 3010c is withdrawn from a hole of the plastic belt 170 and the belt can be stepped to a new position. The presence or absence of the hole 172c determines the magnitude and polarities of the potentials on the C and —C signal lines.

For convenience, it is assumed that there are as many as thirty-one possible programs permanently stored on the control belt 130. This number, however, can be increased or decreased in accordance with the requirements of the data processing apparatus. Therefore, it is necessary to select a specific program to perform the desired operations. The first line of each program is encoded with a combination of A, B, C, D and E signals corresponding to the numbers 1, 2, 4, 8, and 16, or $2^0$ to $2^4$ respectively and is also encoded with the N and P signals. Thus, the N and the P signals are utilized to identify the belt holes as a program, not as a program instruction. An N and a P signal permit the combination of the A, B, C, D, and E signals to be interpreted as a number instead of as control signals. The combination is compared with a combination of switch positions selected by the operator prior to activating the computer. The lines subsequent to the first line may be encoded with an N signal or a P signal, but not both. Their A, B, C, D, E signal combinations serve as instructions to the computer rather than as program numbers. The first lines of the thirty-one programs are encoded with the A, B, C, D, E signals in numerically consecutive order.

When the switch positions are set in the program selector 132 (FIG. 6) indicating the number of the desired program, the operator depresses an initiate key in the program selector 132 generating a DE signal and also a DC signal characteristic of control belt 130 movement in the forward direction which in turn generates a CP signal.

The DE signal is fed (FIG. 5) to the carriage control 152 to initiate a carriage return on both the main printer 154 and the auxiliary printer 155.

Figure 5:
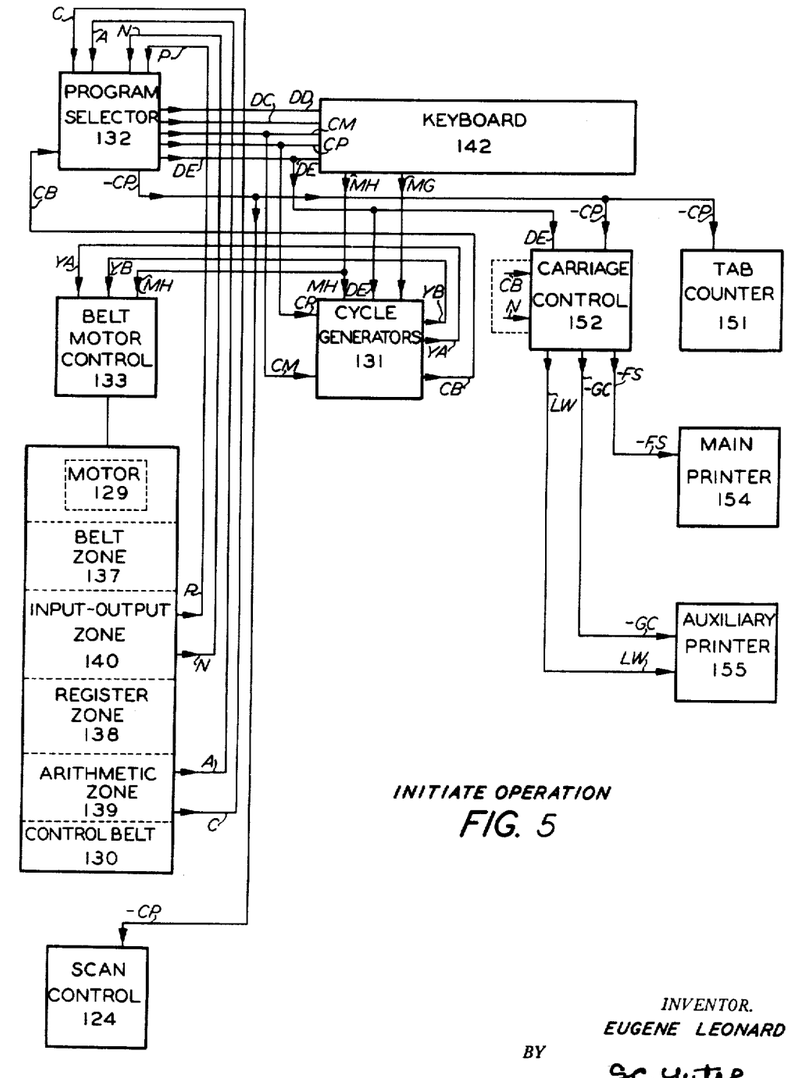
FIG. 5 is a block diagram that illustrates the flow of control signals during the program location operation in accordance with the invention.

The DE signal is also fed to cycle generators 131 to prime the control belt 130 for movement, which takes place at the end of the carriage movements. It is also fed to the keyboard 142 to alert the motor bar circuitry. The DC signal is also fed to the keyboard 142 where cooperating with a signal derived from the DE signal causes the generation of the MG signal by the motor bar circuitry. The MG signal replaces the initial DE signal fed to the cycle generators 131 to provide a continuous train of stepping signals (YA and YB) to the belt motor control 133. The CP signal as a positive signal fed to the cycle generators 131 and the keyboard 142 insures continuous stepped movement of the control belt 130 in the forward direction. As each program instruction is sensed the associated A, B, C, D and E signals from the arithmetic zone 139 are generated, but do not as yet induce computer action. To ensure that no spurious computer action is initiated, the CP signal as a negative signal is fed to the carriage control 152, the tab counter 151 and the scan control 124 to block any possible activation of these units by the signals from the arithmetic zone 139.

The control belt 130 continues stepping forward until an N and a P signal are present at the input-output zone 140. The N and the P signals cooperate in the program selector 132 with a CB signal from the cycle generators 131 causing the generation of a CM signal which terminates the DC signal and the CP signal.

The CM signal is also fed to the keyboard 142 and the cycle generator 131 to prepare the latter for a single forward step movement of the control belt 130. Such single step movement will occur only if the program sensed is the desired program. At the same time of generation of the N and P signals, a comparison commences. The combination of the signals from the arithmetic zone 139 and the signals from the switch positions in the program selector 132 are compared. It will be assumed as an example that the A and C signals (representing $2^0+2^2$)

are present indicating the fifth program. Three possibilities arise:

(1) The switches in the program selector are set for a program designated by a number greater than five.

(2) The switches in the program selector are set for a program designated by a number less than five.

(3) The switches in the program selector are set for a program designated by a number equal to five.

For the first possibility the DC and the CP signals are generated. The operation continues in a similar manner with CP performing its usual functions. The belt 130 is stepped on a continuous basis until the first line of the next higher numbered program is reached.

For the second case a DD signal rather than the DC signal is generated; the DD signal also causes the generation of the CP signal. The operation is otherwise the same, but in addition the DD signal is fed to the keyboard 142 causing the generation of the MH signal. The MH signal fed to the belt motor control 133 causes the control belt 130 to step in the reverse direction, and again on a continuous basis until the first line of the next-lower numbered program is reached.

For the third case, after the generation of the CM signal which had terminated the last previous DC or DD signal (whichever had been present), no new DC or DD signal is generated and the program search terminates.

For the first two cases, the search for the program continues until the third case arises at which time neither the DC nor the DD signals are generated and hence no CP signal is generated. The search terminates for the desired program has been located. The control belt 130 is automatically stepped to the first program instruction of the program and the data processor proceeds to carry out the designated operations. Subsequent advance of the belt is as directed by the belt itself, normally one step at a time. Since the number designations of the programs are in ascending order in the forward direction, it is possible, by knowing the direction of the inequality, to logically search the control belt 130.

To automatically repeat the selected program, the first line of the next program generates the N and P signals and a program number which is greater than the number manually set in the program selector 132. Thus, the control belt 130 is stepped back to the beginning of the program. In this case, only the auxiliary printer 155 performs a carriage return and a multiple line feed. The main printer 154 is not affected for the DE signal is not generated. Instead the combination of an N and CB signal fed to the carriage control 152 activates the carriage of the auxiliary printer 155.

The program selector 132 (FIG. 6) is primarily employed to find a manually selected program. The number representing the selected program is encoded by closing the appropriate switches in a switching matrix. This coded combination is then compared with a combination of signals from the control belt 130 which represents the coded program number. When both combinations are identical the selected program has been located.

Figure 6:
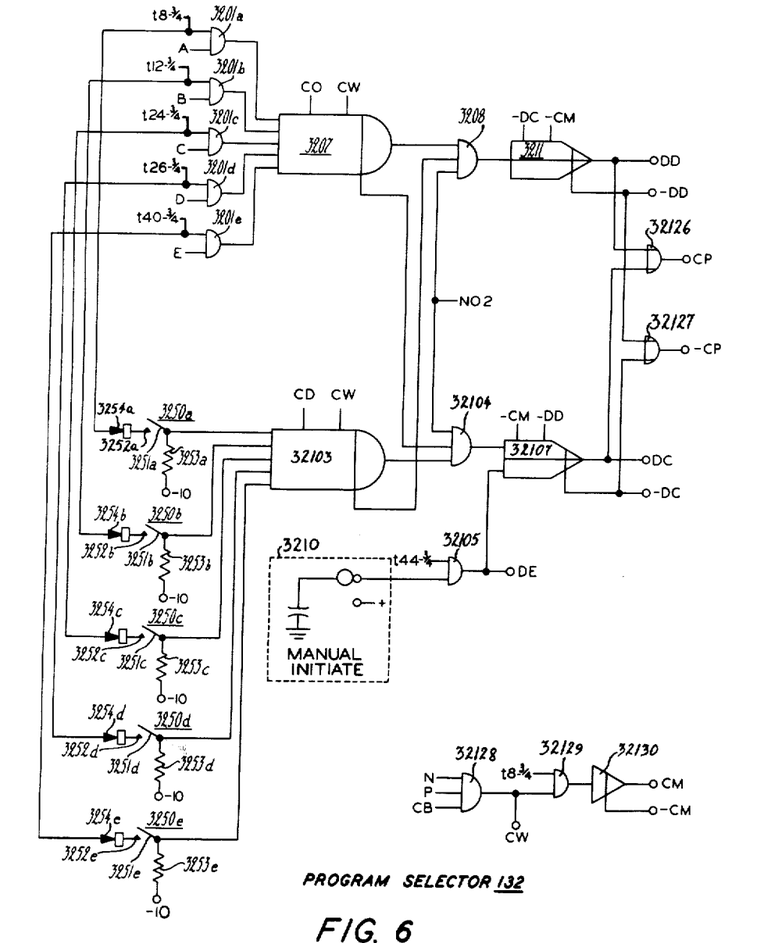
FIG. 6 illustrates by logical symbols the circuit of the program selector which is manually set to indicate the particular program desired.

The moving contact of each of the single-pole single-throw switches 3250 is coupled to an input terminal of the reshaper 32103 and the fixed contact of each of the switches is coupled to a timing signal through an isolation diode 3254. The timing signals $t8$-¾, $t12$-¾, $t24$-¾, $t26$-¾, $t40$-¾ are fed respectively to the input terminal of each of the switches 3250$a$, 3250$b$, 3250$c$, 3250$d$ and 3250$e$. The $t8$-¾ pulse and the A signal are fed into the gate 3201$a$. The $t12$-¾ pulse and the B signal are fed into the gate 3201$b$. The $t24$-¾ pulse and the C signal are fed into the gate 3201$c$. The $t26$-¾ pulse and the D signal are fed into the gate 3201$d$. The $t40$-¾ pulse and the E signal are fed into the gate 3201$e$. The A, B, C, D and E signals originate from the control belt 130. The output terminals of the gates 3201 are coupled to input terminals of the reshaper 3207. Thus, the manual closing of the switch 3250$c$ results in the $t24$-¾ pulse being fed to the reshaper 32103, and the feeding of the C signal to the gate 3201$c$ passes a $t24$-¾ pulse signal to an input terminal of the reshaper 3207. In this manner the switches 3250 are used to locate the combination of signals from the control belt 130 representing the number of the desired program.

The actual comparison operation is initiated by the N and P signals from the control belt 130 which cooperate with a CB signal from the cycle generators 131 at the gate 32128 to cause the generation of the CW signal having a duration of one minor cycle. The CW signal, gates a $t8$-¾ pulse through to gate 32129, and thereby causes the generation of the CM and —CM signals in the pulse amplifier 32130. The CW signal is fed to the blocking terminals of the reshapers 3207 and 32103. The presence of the CW signal at both these blocking terminals permits the reshapers to pass any pulses received at their respective input terminals. The reshapers also receive blocking terminal signals CO and CD under circumstances explained in the Lubkin application. These signals may be disregarded for purposes of the present invention.

The positive output terminal of the reshaper 3207 is coupled to a first input terminal of the gate 3208 and its negative output terminal is coupled to a first input terminal of the gate 32104. The positive output terminal of the reshaper 32103 is coupled to a second input terminal of the gate 32104 and its negative output terminal is coupled to a second input terminal of the gate 3208. The third input terminals of each of the gates 3208 and 32104 are coupled to the NO2 signal line.

The output terminal of the gate 3208 is coupled to the set terminal of the set dominant flip flop 3211 which generates the DD and —DD signals. The reset terminals of this flip flop are coupled to the —CM and —DC signal lines. The output terminal of the gate 32104 is coupled to a set terminal of the set dominant flip flop 32107. The reset terminals of this flip flop are coupled to the —DD and —CM signal lines. The positive output terminals of the flip flops 3211 and 32107 are coupled to the input terminals of the buffer 32126. The negative output terminals of the flip flops 3211 and 32107 are coupled to the input terminals of the buffer 32127.

The operation of the comparator will be described for one of the five possible probing times ($t8$-¾, $t12$-¾, $t24$-¾, $t26$-¾ and $t40$-¾). Assume that a $t24$-¾ pulse signal is fed to both the gate 3201$c$ and to the input terminal of the switch 3250$c$. Four cases are possible:

(1) The C signal is not present at the gate 3201$c$, and the switch 3250$c$ is open, thus indicating both are equivalent to binary zero. No pulse is passed by either the reshaper 3207 or the reshaper 32103. The positive output terminal of the reshaper 3207 is at a negative potential blocking the gate 3208 and the positive output terminal of the reshaper 32103 is at a negative potential blocking the gate 32104.

(2) The C signal is present at the gate 3201$c$ and the switch 3250$c$ is closed, thus indicating both are equivalent to binary one.

A pulse is passed by both the reshaper 3207 and the reshaper 32103. The negative output of the reshaper 3207 is therefore at a negative potential blocking the gate 32104 and the negative output terminal of the reshaper 32103 is also at a negative potential blocking the gate 3208. Neither the gate 3208 nor the gate 32104 passes an NO2 pulse signal.

(3) A C signal is present at the gate 3201$c$ indicating binary one, and the switch 3250$c$ is open indicating binary zero. The number received from the control belt 130 is greater than the number set up by the switches at this time. The reshaper 3207 receives the $t24$-¾ pulse via the gate 3201$c$ to generate a positive potential at the positive output terminal and a negative potential at the negative output terminal.

At the same time, the reshaper 32103 does not receive nor pass a pulse (the switch 3250$c$ is open), and therefore there is a negative potential present at its positive output terminal and a positive potential at its negative ouput terminal. The gate 32104 is blocked but the gate 3208 passes an NO2 pulse which sets the set dominant flip flop 3211 to generate the DD and —DD signals respectively at its positive and negative output terminals. If the set dominant flip flop 3211 had been set, it remains set. If the set dominant flip flop 32107 had been set the —DD signal fed to one of its reset terminals resets it.

(4) A C signal is not present at the gate 3201c indicating binary zero and the switch 3250c is closed indicating binary one. The number received from the control belt 130 is smaller than the number set up by the switches at this time.

The reshaper 3207 receives no $t24$-¾ pulse and therefore its positive output terminal is at a negative potential and its negative output terminal is at a positive potential. At the same time, the reshaper 32103 receives the $t24$-¾ pulse to generate a positive potential at its positive output terminal and a negative potential at its negative ouput terminal.

The gate 3208 is blocked, but the gate 32104 passes an NO2 pulse which is fed to and sets the set dominant flip flop 32107 to generate the DC and —DC signals respectively at its positive and negative output terminals. If the set dominant flip flop 32107 had been set, it remains set. If the set dominant flip flop 3211 had been set the —DC signal fed to one of its reset terminals resets it.

The comparison operation occurs in the same way for all five pulse times. The final states of the set dominant flip flops indicate the result of the comparison and are decisive of the direction of belt movement. If neither flip flop is set then the numbers are equal. If the set dominant flip flop 3211 is set the number from the control belt 130 is greater. If the set dominant flip flop 32107 is set the number set up on the switch matrix is greater. The generation of the DD and DC signals, fed to the computer, indicates in which direction the control belt 130 is to be stepped to seek the desired program. In the course of any given single comparison, as the positions A, B, C, D are compared in order, the set dominant flip flops may be in states opposite their final states. That the final states are nevertheless correct can be seen from the following considerations. The gates 3208 and 32104 are arranged in "exclusive or" fashion, so that they cannot both emit setting signals simultaneously. This follows from previous considerations. Assume that the flip flop 3211 is set prior to the next following comparison of the orders B, C, D or E. As a result of such next following comparison assume that flip flop 32107 is set. Its —DC output signal resets flip flop 3211. In the converse situation, the —DD output signal of the just set flip flop 3211 will reset a previously set flip flop 32107.

The DD and DC signals are fed to inputs of the buffer 32126 to generate a CP signal, and the —DD and —DC signals are fed to the gate 32127 to generate the —CP signal. The CP and —CP signals are fed to the computer to indicate that a program search is being performed.

The —CM signal is fed to the second reset terminal of each of the set dominant flip flops 3211 and 32107 to initially reset them just prior to starting the comparisons.

An initial program search can be started by manually initiating the switch 3210. This switch is depressed and then released to permit the gating of a $t44$-¾ pulse, by the gating of 32105, to the second set terminal of the set dominant flip flop 32107 to start a movement of the control belt 130 for the search of a program.

In this device, the program instruction required to perform the add one to memory register operation is indexed with and identified by the presence of the A and the D control signals. Normally the presence of the A and the D signals determines the occurrence of specific predetermined operations; however, during the search or indexing operation only, the presence of the A and the D signals functions as an index to identify a particular group of program instruction.

During a search procedure when each group of programs is being scanned, the computer is in a non-receptive state to prevent the generation of spurious results. At the instant that the desired group of programs is located, the search procedure ceases, the computer is receptive to belt signals as control signals to instruct the computer, not as program number identification or information signals, and the operation of the device proceeds in a normal manner. Therefore, belt signals are first utilized as information signals for purposes of search to index groups of program instructions, and are then utilized as control signals to instruct the computer.

The add one to memory register group of program instructions is characterized by the presence of the A and the D belt signals in the program identification signal group. The A and D belt signals function alternatively as program number identification signals for program search purposes and as control signals to instruct the computer to add one to the contents of memory registers identified by R pin signals associated with such A and D signals.

The add one to memory register program instruction permits the performance of a unit addition to one or many designated memory registers. Such unit additions are extremely useful where counting operations are required. It should be noted that with suitable programming tally operations similar to those performed by stored program computers may be performed.

The add one to memory register program instruction (FIG. 7) will now be described to illustrate the utilization of belt signals as control signals, and not as information signals.

Figure 7:
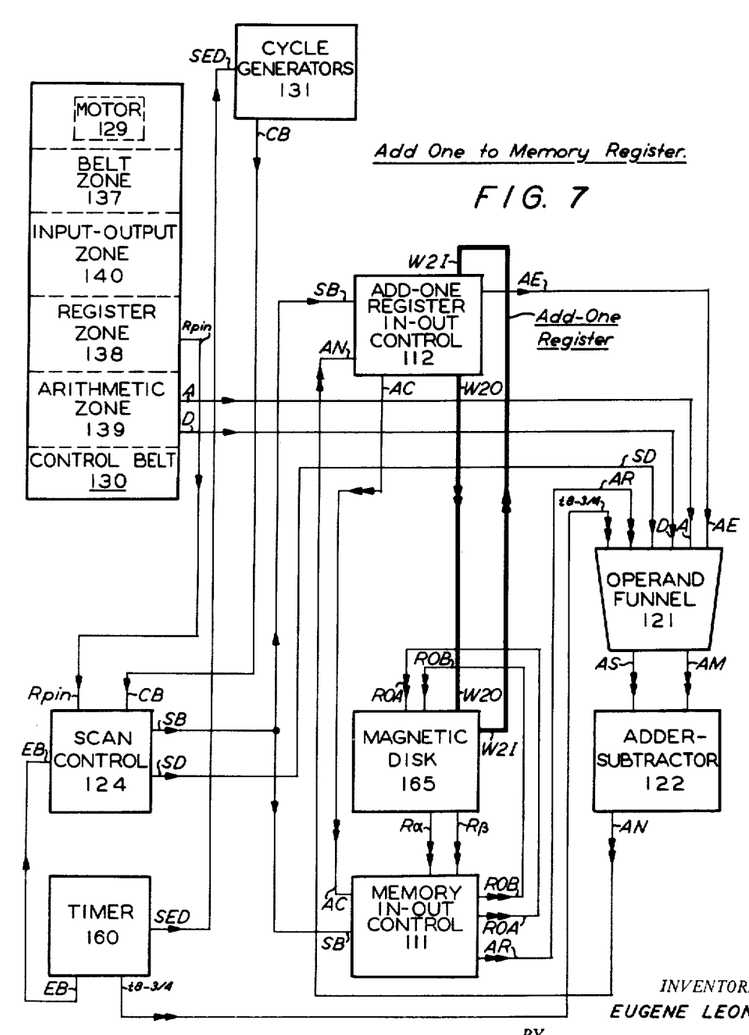
FIG. 7 is a block diagram that illustrates the flow of control and information signals during and add one to memory register program instruction.

The A and D signals generated by the arithmetic zone 139 of the control belt 130 are characteristic of this program instruction.

The program instruction, like the other arithmetic program instructions, starts with the transmission of a CB signal from the cycle generators 131 to the scan control 124 causing the generation of an SB signal and the accompanying scan cycle.

The SB signal fed to the add-one register in-out control 112 engenders generation of the AN output signal of the adder-subtractor 122. The AN signal serves as input signal to the add-one register 112. The AE signal derived from the SB signal in the add-one register in-out control 112 engenders generation of the AR output signal of the memory in-out control 111. The AR signal serves as input signal to the operand funnel 121. Also, the SB signal fed to the memory in-out control 111 engenders generation of the AR output signal of the add-one register. The AC signal serves as input signal to the memory in-out control 111.

The contents of all the memory registers then circulate as follows: from the memory register in-out control 111 as the AR signal to the operand funnel 121, from the operand funnel 121 as the AM signal to the adder-subtractor 122, from the adder-subtractor 122 as the AN signal to the add-one register; after circulating in the add-one register the information is fed as the AC signal from the add-one register in-out control 112 to the memory in-out control 111 for storage in the appropriate memory register on the magnetic disc 165.

Whenever a unit addition is to be performed on a number stored within a designated memory register an R pin signal associated with the designated memory register is fed from the register zone 138 of the control belt 130 to the scan control 124 causing the generation of an SD signal.

The SD signal fed to the operand funnel 121 cooperates with the A and the D signals from the arithmetic zone 139 to permit a $t8$-¾ pulse from the timer 160 to enter the adder-subtractor 122 as an AS signal. The entry of this $t8$-¾ pulse is equivalent to adding one to the third least significant digit position of the contents of the memory register then circulating through the adder-subtractor 122.

If the contents of more than one memory register are to be increased, an R pin signal is generated for each of the desired memory registers.

When all the memory registers on one track are scanned, an EB signal from the timer 160 fed to the scan control 124 causes the generation of an SED signal. The SED signal fed to the cycle generators 131 terminates the program instruction in the usual manner.

The belt motor control 133 (FIG. 8) moves the program tape in either direction (backwards or forwards) to a desired area of information. The location of the group of desired areas of information can be adjacent to or remote from the last group of areas of information utilized. The linear distance travelled by the tape is controlled by a plurality of signals YA, −YA, YB, and −YB generated in the cycle generators 131. The direction of movement of the tape is controlled by the MH and −MH signals generated in the keyboard 142.

Figure 8:
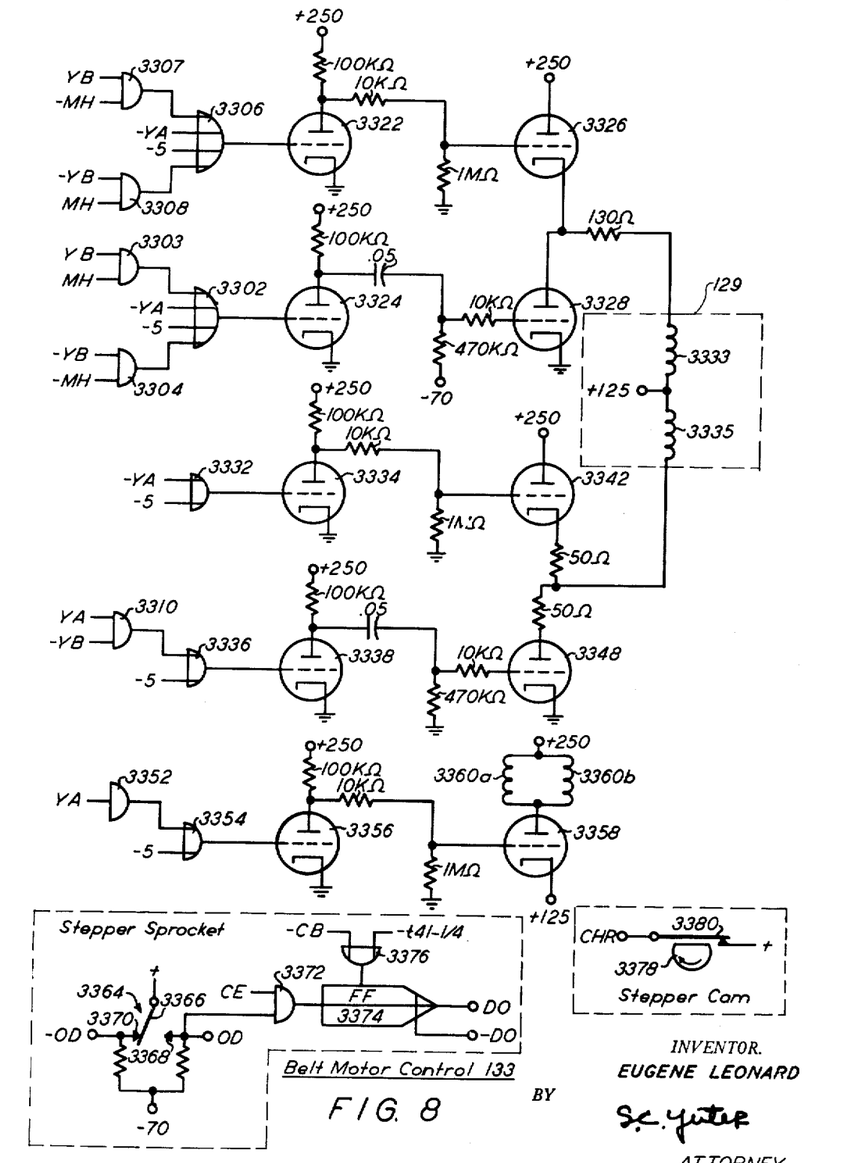
FIG. 8 is a block and schematic diagram of the control belt motor circuit.

The YB and −MH signals are fed into the two input gate 3307. The −YB and MH signals are fed into a two input gate 3308. A buffer 3306 is coupled to receive, as inputs, the output signals from the gates 3307 and 3308, the −YA signal and a potential of minus five volts. The output of the buffer 3306 is coupled to the control grid of a vacuum tube 3322 having a cathode that is coupled to ground and an anode that is coupled to a potential of plus two hundred and fifty volts through a resistance of 100K ohms. The control grid of a vacuum tube 3326 is coupled to ground through a 1M ohm resistor and to the anode of the vacuum tube 3322 through a 10K ohm resistor. The anode of the vacuum tube 3326 is coupled directly to a potential of two hundred and fifty volts.

The YB, and MH signals are fed into a two input gate 3303; and the −YB and −MH signals are fed into the gate 3304. The output signals from the gates 3303 and 3304, the −YA signal and a potential of minus five volts are fed to four input terminals of the buffer 3302. The output terminal of the buffer 3302 is coupled to the control grid of the vacuum tube 3324. The cathode of this vacuum tube is coupled directly to ground and the anode is coupled to a potential of plus two hundred and fifty volts through a 100K ohm resistor. The anode of the vacuum tube 3324 is coupled to the control grid of the vacuum tube 3328 through a condenser and resistor in series. The junction point of the condenser and resistor is coupled to a potential of minus seventy volts through a 470K ohms resistor. The cathode of the vacuum tube 3328 is coupled directly to ground and the anode of this tube is coupled to the cathode of the vacuum tube 3326.

A −YA signal and a potential of minus five volts are fed into the buffer 3332. The control grid of the vacuum tube 3324 is coupled to the output terminal of the buffer 3332. The vacuum tube 3334 contains a cathode coupled directly to ground and an anode coupled to a potential of plus two hundred and fifty volts through a 100K ohm resistor. The control grid of the vacuum tube 3342 is coupled to ground through a 1M ohm resistor and coupled to the anode of the vacuum tube 3334 through a 10K ohm resistor. The anode of the vacuum tube 3342 is coupled directly to a potential of plus two hundred and fifty volts.

The YA and −YB signals are fed to the two input terminals of the gate 3310. A buffer 3336 is coupled to receive at its input terminals the output signal from the gate 3310 and a potential of minus five volts. The control grid of the vacuum tube 3338 is coupled to the output terminal of the buffer 3336. The cathode of the vacuum tube 3338 is coupled directly to ground and the anode is coupled to a potential of plus two hundred fifty volts through a 100K ohm resistor. The anode is also coupled to the control grid of the vacuum tube 3348 through a condenser and resistor connected in series. The junction point of the series coupled condenser and resistor is coupled to ground through a 470K ohm resistor. The cathode of the vacuum tube 3348 is coupled to ground and its anode is coupled to the cathode of the vacuum tube 3342 through two fifty ohm resistors connected in series.

The program stepping motor 129 contains the stepping winding 3333 and a holding winding 3335. One end of the stepping winding is connected to the anode of vacuum tube 3328 through a 130 ohm resistor. One end of the holding winding is coupled to the junction point of the two fifty ohm series coupled resistors. The other ends of the stepping winding and the holding winding are connected together and to a potential of plus one hundred twenty-five volts.

The stepping motor 129 is manufactured by The General Electric Company under model number 55MY54HB1.

The vacuum tubes 3348 and 3326 may be considered to be normally conducting and the vacuum tubes 3328 and 3342 are normally cut off. Therefore, the presence of a signal at the output terminal of the buffer 3306 (a positive potential) will cause the vacuum tube 3326 to stop conducting. The presence of a signal (a positive potential) at the output terminal of the buffer 3302 will cause the vacuum tube 3328 to conduct. The absence of a signal (no positive potential) at the output terminal of the buffer 3332 will cause the vacuum tube 3342 to conduct. The presence of a signal (a positive potential) at the output of the buffer 3336 will stop the vacuum tube 3348 from conducting.

In the operation of this unit, if the MH signal is not present the control belt will move in a forward direction. The MH signal is either on or off depending upon the direction in which the tape is to move. The YA and YB signals are generated in the cycle generators 131. These signals orient or step the stepping motor 129 one forty-eighth of a complete revolution.

The time occurrence of the YA and YB signals relative to each other during the stepping of the motor is as follows:

First the YA signal appears. Approximately ten milliseconds later the YB signal appears. Approximately ten milliseconds after the start of the YB signal the YA signal stops. Thus, the YA signal has a duration of about twenty milliseconds. Approximately ten milliseconds after the ending of the YA signal the YB signal stops. Thus, the YB signal has a duration of about twenty milliseconds. During the first ten millisecond period, or during the occurrence of the YA signal only, acceleration of the stepping motor 129 occurs. During the second ten millisecond period, or during the simultaneous occurrence of the YA and the YB signals, deacceleration of the stepping motor occurs. During the third ten millisecond period, or during the occurrence of the YB signal only, the stepping motor is brought to a stop.

The values of the electrical components are representative only, and are not meant as a limitation, it being understood that components having other values may be substituted for the components shown.

The signals from the control belt 130 are generated by means of small pins that contact discretely located holes in the program tape. Thus a particular control belt signal is indicated by a hole in a particular location and is sensed by a particular pin. The pins contact the tape and are actuated by a solenoid. However, when the control belt 130 is stepped from one position to another the pins must be withdrawn from the holes to prevent destruction of the control belt 130. This is done by de-energizing the solenoids and allowing preloaded springs to return the pins to the withdrawn position. The amplifier that feeds the pin-activating solenoids is normally conducting. This amplifier becomes nonconducting when the YA signal is present.

The YA signal is fed through an isolation gate 3352 to an input terminal of a buffer 3354 that is also coupled to receive a potential of minus five volts. The output terminal of the buffer 3354 is coupled to the control grid of the vacuum tube 3356. The cathode of the vacuum tube is connected to ground and the anode is connected to a potential of plus two hundred and fifty volts through a 100K ohm resistor. The grid of the vacuum tube 3358 is connected to the plate of the vacuum tube 3356 through a resistor and is coupled to ground through a 1M ohm resistor. The cathode of the vacuum tube 3358 is coupled to a potential of one hundred and twenty-five volts and the plate is coupled to a potential of plus two hundred and fifty volts through solenoid coils 3360. The vacuum tube 3358 is normally conducting. However, the presence of the YA signal allows the vaccum tube 3356 to conduct which in turn cuts off the vacuum tube 3358.

Under normal operating conditions the stepping motor 129 will be stepped by the occurrence of a YA signal. However, it is possible that the stepping motor 129 will not be stepped by the occurrence of the YA signal. Therefore, to prevent the generation of spurious results that can be caused by the non-movement of the stepping motor in response to the YA signal, a scanning device has been incorporated to sense the movement of the program stepping motor. If the motor does not step at the first occurrence of the YA and YB signals, these signals will be regenerated until the motor steps.

A switch 3364 having a movable contact 3366 and two stationary contacts 3368 and 3370 is activated by the movement of the program stepping motor 129. Each step position that the program stepping motor makes the movable contact 3366 is moved left or right to contact the stationary contacts 3368 or 3370. Thus if the switch is initially in the position as shown, the movement of the program stepping motor will reorient the movable contact 3366 to the right to contact the stationary contact 3368; and the next step position of the program stepping motor 129 will orient the movable contact 3366 to the left to contact the stationary contact 3370. The stationary contacts 3370 and 3368 are coupled respectively to the —OD and OD signal lines. The stationary contact 3368 is also coupled to an input terminal of the gate 3372. A second input terminal of the gate 3372 is coupled to receive the CE signal. The movable contact 3366 is coupled to a positive potential and the stationary contacts 3368 and 3370 are coupled to a negative potential through a resistor.

The output of the gate 3372 is fed into a set dominant flip flop 3374 having a positive output terminal DO and a negative output terminal —DO. A buffer 3376, coupled to receive the —CB signal and the —t41-¼ pulse, feeds the reset terminal of the set dominant flip flop 3374.

The YA and YB signals that step the control belt 130 are generated in the cycle generators 131 under the control of the presence of a CQ signal. The YA and YB signals will be continuously generated as long as the CQ signal is present. The CQ signal is initiated in the cycle generators 131 by a CE signal. The CQ signal is terminated in the cycle generators 131 by the generation of a —CB signal.

The —CB signal is generated at the termination of a cycle of YA and YB signals provided one of the two following conditions is satisfied after the motor 129 has moved:

(1) The flip flop 3374 is set and the movable contact 3366 of the switch 3364 is in contact with the contact 3370, or (2) The flip flop 3374 is reset and the movable contact 3366 is in contact with the stationary contact 3368.

To describe the sequence of events during operation it will be assumed that towards the end of a cycle of YA and YB signals when the control belt 130 is stopping at a new position, the flip flop 3374 is in a set condition and the movable contact 3366 is in contact with the stationary contact 3370. Thus, there is a positive potential at the —OD terminal and a negative potential at the OD terminal. The above first conditions are satisfied and permit the generation of the —CB signal which resets the flip flop 3374 and terminates the CQ signal in the cycle generators 131.

The computer now performs the program steps designated by the new position of the control belt 130. At the end of the program step another CE signal which initiates a CQ signal is generated. The CE signal fed to an input terminal of the gate 3372 attempts to set the flip flop 3374; however the OD signal feeding a second input to the gate 3372 is at a negative potential and a set pulse does not pass to the gate 3372.

The CQ signal causes the generation of the YA and YB signals and the control belt 130 now starts stepping to a new position. In the course of stepping to the new position the movable contact 3366 of the switch 3364 is transferred from the stationary contact 3370 to the stationary contact 3368. Towards the end of this YA and YB signal cycle it is seen that the flip flop 3374 is reset and the movable contact 3366 is in contact with the stationary contact 3368 to satisfy the second condition. Thus, the —CB signal in the cycle generators 131 is generated. The —CB signal terminates the CQ signal and the control belt 130 is at its new position. The computer then proceeds to perform the program instruction as directed by the control belt 130. At the end of this program instruction another CE signal is generated. The CE signal causes the generation of the CQ signal. The CE signal is also fed to an input terminal of the gate 3372. Since the movable contact 3366 is in contact with the stationary contact 3368 the OD signal fed to the second input terminal of the gate 3372 is positive and the flip flop 3374 is set.

The CQ signal causes its usual generation of the YA and YB signals and the control belt 130 is stepped to a new position. During the stepping to the new position, the movable contact 3366 transfers to contact the stationary contact 3370. At the end of the YA and the YB signals it is seen that the flip flop 3374 is set and the movable contact 3366 of the switch 3364 is in contact with the stationary contact 3370 and the first condition for generating a —CB signal is once more satisfied. These operations will continue as the control belt 130 is stepped from one position to another position. If during one of the stepping operations the control belt 130 does not move after the generation of the YA and the YB signals, it then becomes necessary to regenerate these signals.

The conditions in which the program stepping motor was not responsive to the YA and the YB signals will now be considered. It will be assumed that the movable contact 3366 is in contact with the stationary contact 3370 and a program instruction is being terminated. Therefore the CE signal is generated which initiates the CQ signal. The CE signal is also fed to the gate 3372 to cause the flip flop 3374 to set. The CQ signal causes the generation of the YA and YB signals but the stepper motor 129 and therefore the control belt 130 fail to move in response. Therefore, the movable contact 3366 remains in contact with the stationary contact 3368. At the end of the generation of the YA and YB signals, it is seen that the flip flop 3374 is still set and the movable contact 3366 is still in contact with the stationay contact 3368. This arrangement of the position of the switch and the state of the flip flop 3374 does not satisfy the first of the two conditions normally required at this stage to generate the —CB signal, and incidentally also fails to satisfy the second condition. The —CB signal is therefore not generated and consequently the CQ signal is not terminated, nor is the flip flop 3374 reset. The presence of the CQ signal causes the generation of the YA and YB signals for a second time. These signals again attempt to move the control belt 130. If the control belt 130 moves as a result of this attempt the first condition for generating the —CB signal will be satisfied and normal operation will again be initiated.

It is readily seen that a similar regeneration of YA and YB signals will occur in the alternate set of circumstances of failure of response of the motor 129. Here we begin with engagement of the contacts 3364 and 3370. The CE signal cannot set flip flop 3374. The motor 129 should move at the termination of the YA and YB signals, but fails to do so. Thus the second condition is violated, signal —CB is not generated and the YA and YB signals are regenerated until the motor does respond.

Thus each time the YA and YB signals are generated the program stepping motor 129 will step one position. However if the motor 129 does not cause a step when the YA and YB signals are generated, these signals will be regenerated until the motor 129 and the control belt 130 are responsive. This prevents false reperformance of the previous program.

The utilization of this invention has been described relative to a particular electronic data processing apparatus for clarity of description only, it being understood that this invention can be incorporated with other data processing apparatus that requires a program device.

Obviously many modifications and variations of the present invention are possible in the light of the above teachings. It is therefore to be understood that within the scope of the appended claims the invention may be practiced otherwise than as specifically described.

What is claimed is:

1. In a digital computer provided with a belt on which a plurality of computer instruction programs are recorded in the form of indicia arranged in lines extending transversely of said belt, each program comprising a plurality of consecutive lines the first of which is a program number identification line and the remainder of which are computer instruction lines, the program number lines bearing indicia of the program numbers in numerically consecutive order, a line in each program bearing indicia distinguishing the associated program number identification line from the computer instruction lines: the combination of sensing devices corresponding in number to the maximum possible number of recorded indicia per belt line adapted to produce respective electrical signals in response to corresponding indicia of each given line; a reversibly operable stepping device adapted normally to advance said belt in the forward direction one line at a time in response to an instruction from said computer originating on said belt and then stop pending receipt of another belt-originating instruction to advance once more; means settable to store the number of the program desired to be performed by said computer; means responsive to sensing of said distinguishing indicia for stopping said belt for examination of the corresponding program number; comparison means activated by said distinguishing indicia sensing responsive means for comparing the corresponding sensed program number with said stored program number and adapted to reflect their inequality and the sense of such inequality, or equality; excitation means for said stepping device connected to said comparison means, said excitation means being responsive to reflected inequality to actuate said stepping device to step said belt on a continuous basis and in the direction towards the desired program in accordance with the sense of the inequality for another comparison at the next program number line, and being responsive to sensed equality for advancing said stepping device in the forward direction one line to the initial computer instruction line of the located desired program; and means also responsive to reflected inequality for preventing spurious computer operation as the computer instruction lines are traversed while proceeding to such next program number line.

2. In a digital computer provided with a belt on which a plurality of computer instruction programs are recorded in the form of indicia arranged in lines extending transversely of said belt and zones extending longitudinally thereof, each program comprising a plurality of consecutive lines the first of which is a program number identification line and the remainder of which are computer instruction lines, the program number lines bearing indicia of the program numbers in numerically consecutive order, the program numbers being located in a common zone, said common zone being available for instructions for said computer additional to the instructions borne in the remaining zones of the computer instruction lines, a line in each program bearing indicia distinguishing the associated program number identification line from the computer instruction lines, the latter distinguishing indicia of the several programs being arranged in a common zone which is available for instructions for said computer in the lines not bearing such distinguishing indicia: the combination of sensing devices corresponding in number to the maximum possible number of recorded indicia per belt line adapted to produce respective electrical signals in response to corresponding indicia of each given line; a reversibly operable stepping device adapted normally to advance said belt in the forward direction one line at a time in response to an instruction from said computer originating on said belt and then stop pending receipt of another belt-originating instruction to advance once more; means settable to store the number of the program desired to be performed by said computer; means responsive to sensing of said distinguishing indicia for stopping said belt for examination of the corresponding program number; comparison means activated by said distinguishing indicia sensing responsive means for comparing the corresponding sensed program number with said stored program number and adapted to reflect their inequality and the sense of such inequality, or equality; excitation means for said stepping device connected to said comparison means, said excitation means being responsive to reflected inequality to actuate said stepping device to step said belt on a continuous basis and in the direction towards the desired program in accordance with the sense of the inequality for another comparison at the next program number line, and being responsive to sensed equality for advancing said stepping device in the forward direction one line to the initial computer instruction line of the located desired program; means also responsive to reflected inequality for preventing spurious computer operation as the computer instruction lines are traversed while proceeding to such next program number line; and means for applying signals derived from belt indicia, located in one of said common zones and in a computer instruction line, to said computer as an instruction as distinguished from a program number to cause performance by said computer of such instruction in addition to the program instructions sensed in other zones of such computer instruction line.

3. In a digital computer provided with a belt on which a plurality of computer instruction programs are recorded in the form of indicia arranged in lines extending transversely of said belt and zones extending longitudinally thereof, each program comprising a plurality of consecutive lines the first of which is a program number identification line and the remainder of which are computer instruction lines, the program number lines bearing indicia of the program numbers in numerically consecutive order, the program numbers being located in a common zone, a line in each program bearing indicia distinguishing the associated program number identification line from the computer instruction lines: the combination of sensing devices corresponding in number to the maximum possible number of recorded indicia per belt line adapted to produce respective electrical signals in response to sensing the corresponding indicia of each given line; a reversibly operable stepping device adapted normally to advance said belt in the forward direction one line at a time in response to an instruction from said computer originating on said belt and then stop pending receipt of another belt-originating instruction to advance once more; means settable to store the number of the program desired to be performed by said computer; means responsive to sensing of said distinguishing indicia for stopping said belt for examination of the corresponding program number; comparison means activated by said distinguishing indicia sensing responsive means for comparing the corresponding sensed program number with said stored program number and adapted to reflect their inequality and the sense of such inequality, or equality; excitation means for said stepping device connected to said comparison means, said excitation means being responsive to reflected inequality to actuate said stepping device to step said belt on a continuous basis and in the direction towards the desired program in accordance with the sense of the inequality for another comparison at the next program number line, and being responsive to sensed equality for advancing said stepping device in the forward direction one line to the initial computer instruction line of the located desired program; means also responsive to reflected inequality for preventing spurious computer operation as the computer instruction lines are traversed while proceeding to such next program number line; and additional computer instructing means for applying signals derived from belt indicia, located in said common zone and in a computer instruction line, to said computer as an instruction as distinguished from a program number to cause performance by said computer of such instruction in addition to the program instructions sensed in other zones of such computer instruction line.

4. In a digital computer provided with a belt on which a plurality of computer instruction programs are recorded in the form of indicia arranged in lines extending transversely of said belt and zones extending longitudinally thereof, each program comprising a plurality of consecutive lines the first of which is a program number identification line and the remainder of which are computer instruction lines, the program number lines bearing indicia of the program numbers in numerically consecutive order, the program numbers being located in a common zone, the program number identification line in each program bearing indicia distinguishing it from the computer instruction lines: the combination of sensing devices corresponding in number to the maximum possible number of recorded indicia per belt line adapted to produce respective electrical signals in response to sensing the corresponding indicia of each given line; a reversibly operable stepping device adapted normally to advance said belt in the forward direction one line at a time in response to an instruction from said computer originating on said belt and then stop pending receipt of another belt-originating instruction to advance once more; means settable to store the number of the program desired to be performed by said computer; means responsive to sensing of said distinguishing indicia for stopping said belt for examination of the corresponding program number; comparison means activated by said distinguishing indicia sensing responsive means for comparing the corresponding sensed program number with said stored program number and adapted to reflect their inequality and the sense of such inequality, or equality; excitation means for said stepping device connected to said comparison means, said excitation means being responsive to reflected inequality to actuate said stepping device to step said belt on a continuous basis and in the direction towards the desired program in accordance with the sense of the inequality for another comparison at the next program number line, and being responsive to sensed equality for advancing said stepping device in the forward direction one line to the initial computer instruction line of the located desired program; means also responsive to reflected inequality for preventing spurious computer operation as the computer instruction lines are traversed while proceeding to such next program number line; and additional computer instructing means for applying signals derived from belt indicia, located in said common zone and in a computer instruction line, to said computer as an instruction as distinguished from a program number to cause performance by said computer of such instruction in addition to the program instructions sensed in other zones of such computer instruction line.

5. Apparatus according to claim 3, wherein the computer includes a memory in turn including a plurality of registers for storing numbers therein, and means adapted to add one to the contents of said registers, the indicia of one of the aforesaid other zones and the signals produced by the associated sensing means being respectively associated with said registers, the aforesaid additional computer instructing means actuating said add one means to add one to the contents of those of said registers as are called for by the last-mentioned associated sensing means.

6. Apparatus according to claim 4, wherein the computer includes a memory in turn including a plurality of registers for storing numbers therein, and means adapted to add one to the contents of said registers, the indicia of one of the aforesaid other zones and the signals produced by the associated sensing means being respectively associated with said registers, the aforesaid additional computer instructing means actuating said add one means to add one to the contents of those of said registers as are called for by the last-mentioned associated sensing means.

References Cited in the file of this patent

UNITED STATES PATENTS

| | | |
|---|---|---|
| 2,549,071 | Dusek | Apr. 17, 1951 |
| 2,645,764 | McWhirter | July 14, 1953 |
| 2,679,638 | Bensky | May 25, 1954 |
| 2,782,398 | West et al. | Feb. 19, 1957 |
| 2,858,526 | Deutsch | Oct. 28, 1958 |